US012186875B2

(12) United States Patent
Shige et al.

(10) Patent No.: US 12,186,875 B2
(45) Date of Patent: Jan. 7, 2025

(54) WORKING TOOL

(71) Applicant: Koki Holdings Co., Ltd., Tokyo (JP)

(72) Inventors: Tetsuhito Shige, Ibaraki (JP); Tatsuya Ito, Ibaraki (JP); Daiki Kiyohara, Ibaraki (JP); Hiroaki Irei, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 50 days.

(21) Appl. No.: 17/922,092

(22) PCT Filed: Mar. 31, 2021

(86) PCT No.: PCT/JP2021/013760

§ 371 (c)(1),
(2) Date: Oct. 28, 2022

(87) PCT Pub. No.: WO2021/220703

PCT Pub. Date: Nov. 4, 2021

(65) Prior Publication Data

US 2023/0166390 A1 Jun. 1, 2023

(30) Foreign Application Priority Data

Apr. 28, 2020 (JP) ................................ 2020-078805

(51) Int. Cl.
*B25F 5/00* (2006.01)
*B25C 1/06* (2006.01)

(52) U.S. Cl.
CPC . *B25F 5/00* (2013.01); *B25C 1/06* (2013.01)

(58) Field of Classification Search
CPC .................................... B25C 1/06; B25F 5/00
See application file for complete search history.

(56) References Cited

U.S. PATENT DOCUMENTS

2005/0001004 A1* 1/2005 Fujisawa .................. B25C 1/08 227/130
2008/0067213 A1* 3/2008 Shima ...................... B25C 1/06 227/129

(Continued)

FOREIGN PATENT DOCUMENTS

JP 2016-049577 A 4/2016
JP 2018-089715 A 6/2018

(Continued)

OTHER PUBLICATIONS

International Search Report issued in corresponding International Application No. PCT/JP2021/013760, dated Jun. 8, 2021 w/English Translation (5 pages).

*Primary Examiner* — Joshua G Kotis
*Assistant Examiner* — Scott A Howell
(74) *Attorney, Agent, or Firm* — Rimon P.C.

(57) ABSTRACT

A nailer for suppressing misfire while keeping operability. In a first mode, a control circuit drives a drive source when a second ON determination is made and a first ON determination is made in a state where a second operation unit is maintained at a second ON position, and when the drive source is driven and then a second OFF determination is made in a state where a first operation unit is maintained at a first ON position, the control circuit does not drive the drive source again unless returning to the initial state. In a second mode, the control circuit drives the drive source when the first ON determination is made and the second ON determination is made in a state where the first operation unit is maintained at the first ON position. A second OFF determination time in the second mode is longer than in the first mode.

11 Claims, 13 Drawing Sheets

(56) References Cited

U.S. PATENT DOCUMENTS

| | | | | |
|---|---|---|---|---|
| 2008/0073405 | A1* | 3/2008 | Shima | B25C 1/06 227/129 |
| 2009/0255972 | A1* | 10/2009 | Shima | B25C 5/1689 227/8 |
| 2010/0102102 | A1* | 4/2010 | Matsunaga | B25C 1/06 227/8 |
| 2010/0237124 | A1* | 9/2010 | Shima | B25C 1/06 227/129 |
| 2010/0237126 | A1* | 9/2010 | Matsunaga | B25C 1/08 227/8 |
| 2014/0263535 | A1* | 9/2014 | Rajani | B25C 1/06 173/1 |
| 2018/0154505 | A1* | 6/2018 | Sato | B25C 1/047 |
| 2020/0114501 | A1* | 4/2020 | Mashiko | B25C 1/04 |
| 2020/0391364 | A1* | 12/2020 | Yasutomi | B25C 1/008 |

FOREIGN PATENT DOCUMENTS

| | | | |
|---|---|---|---|
| JP | 2019-025641 | A | 2/2019 |
| JP | 2019-107710 | A | 7/2019 |
| WO | 2019/026502 | A1 | 2/2019 |

* cited by examiner

FIG. 10

| | TRIGGER SWITCH OFF DETERMINATION TIME | PUSH LEVER SWITCH OFF DETERMINATION TIME |
|---|---|---|
| SINGLE FIRE MODE | 100ms | 30ms |
| CONTINUOUS FIRE MODE | 30ms | 130ms |

FIG. 12

| | TRIGGER SWITCH OFF DETERMINATION TIME | PUSH LEVER SWITCH OFF DETERMINATION TIME |
|---|---|---|
| SINGLE FIRE MODE | 30ms | 30ms |
| CONTINUOUS FIRE MODE | 30ms | 130ms |

WORKING TOOL

CROSS REFERENCE TO RELATED APPLICATIONS

This application is the U.S. National Phase under 35 U.S.C. § 371 of International Application No. PCT/JP2021/013760, filed on Mar. 31, 2021, which claims the benefit of Japanese Application No. 2020-078805, filed on Apr. 28, 2020, the entire contents of each are hereby incorporated by reference.

TECHNICAL FIELD

The present invention relates to a working tool.

BACKGROUND ART

A nailer which is an example of a working tool includes a trigger and a switch lever operated by a worker. Further, the trigger is provided with a trigger switch for detecting that the trigger is operated, and the switch lever is provided with a push lever switch for detecting that a main body of the working tool is pressed to a workpiece.

As disclosed in Patent Document 1, a control unit of the working tool has a single fire mode and a continuous fire mode. In the single fire mode, nailing is done each time when the trigger switch is turned on in the state where the push lever switch is on. On the other hand, nailing is not done even if the push lever switch is turned on in the state where the trigger switch is on.

Meanwhile, in the continuous fire mode, nailing is done each time when the push lever switch is turned on in the state where the trigger switch is on. On the other hand, nailing is not done even if the trigger switch is turned on in the state where the push lever switch is on.

RELATED ART DOCUMENTS

Patent Documents

Patent Document 1: Japanese Unexamined Patent Application publication No. 2018-089715

SUMMARY OF THE INVENTION

Problem to be Solved by the Invention

By the way, in the single fire mode, when the trigger switch is turned on in the state where the working tool is pressed to the workpiece and the push lever switch is turned on, the trigger switch is repeatedly turned on and off in a short period of time due to the impact of driving or the like in some cases. Consequently, the second nailing that the worker does not intend is done, resulting in a misfire.

A similar phenomenon may occur also in the continuous fire mode. Namely, in the state where the worker turns on the trigger switch, the push lever switch is repeatedly turned on and off in a short period of time due to the impact of driving or the like in some cases. Consequently, the second nailing that the worker does not intend is done, resulting in a misfire.

As a countermeasure for such a situation, for example, the misfire can be prevented by lengthening the OFF determination time that defines the time from when the trigger switch and the push lever switch are turned off to when the control unit determines that these switches are turned off. On the other hand, however, if the OFF determination time is lengthened, a time lag occurs between the operation of the worker and the OFF determination of the control unit, resulting in the deterioration in operability.

An object of the present invention is to provide a working tool capable of suppressing the misfire while keeping the operability.

Means for Solving the Problems

A working tool according to an embodiment includes: a drive source; a control circuit configured to control driving of the drive source; a first operation unit capable of being switched between a first ON position and a first OFF position by an operation of a worker; and a second operation unit capable of being switched between a second ON position and a second OFF position by the operation of the worker. The control circuit has a first mode and a second mode. The control circuit is configured to make a first ON determination to determine that the first operation unit has moved from the first OFF position to the first ON position, a first OFF determination to determine that the first operation unit has moved from the first ON position to the first OFF position, a second ON determination to determine that the second operation unit has moved from the second OFF position to the second ON position, and a second OFF determination to determine that the second operation unit has moved from the second ON position to the second OFF position. The control circuit makes the first OFF determination when the first OFF position is maintained until a first OFF determination time elapses after the first operation unit moves from the first ON position to the first OFF position, and the second OFF determination when the second OFF position is maintained until a second OFF determination time elapses after the second operation unit moves from the second ON position to the second OFF position. In the first mode, in an initial state where the first operation unit is at the first OFF position and the second operation unit is at the second OFF position, the control circuit drives the drive source when the second ON determination is made and the first ON determination is made in a state where the second operation unit is maintained at the second ON position, and when the drive source is driven and then the second OFF determination is made in a state where the first operation unit is maintained at the first ON position, the control circuit does not drive the drive source again unless the first OFF determination is made to return to the initial position. In the second mode, in the initial state, the control circuit drives the drive source when the first ON determination is made and the second ON determination is made in a state where the first operation unit is maintained at the first ON position. The second OFF determination time in the second mode is longer than the second OFF determination time in the first mode.

Effects of the Invention

According to the present invention, it is possible to suppress the misfire while keeping the operability.

BRIEF DESCRIPTION OF THE DRAWINGS

FIG. 10 is a table showing an example of an OFF determination time;

FIG. 12 is a table showing another example of an OFF determination time.

DETAILED DESCRIPTION OF PREFERRED EMBODIMENTS

First Embodiment

Figure 1:
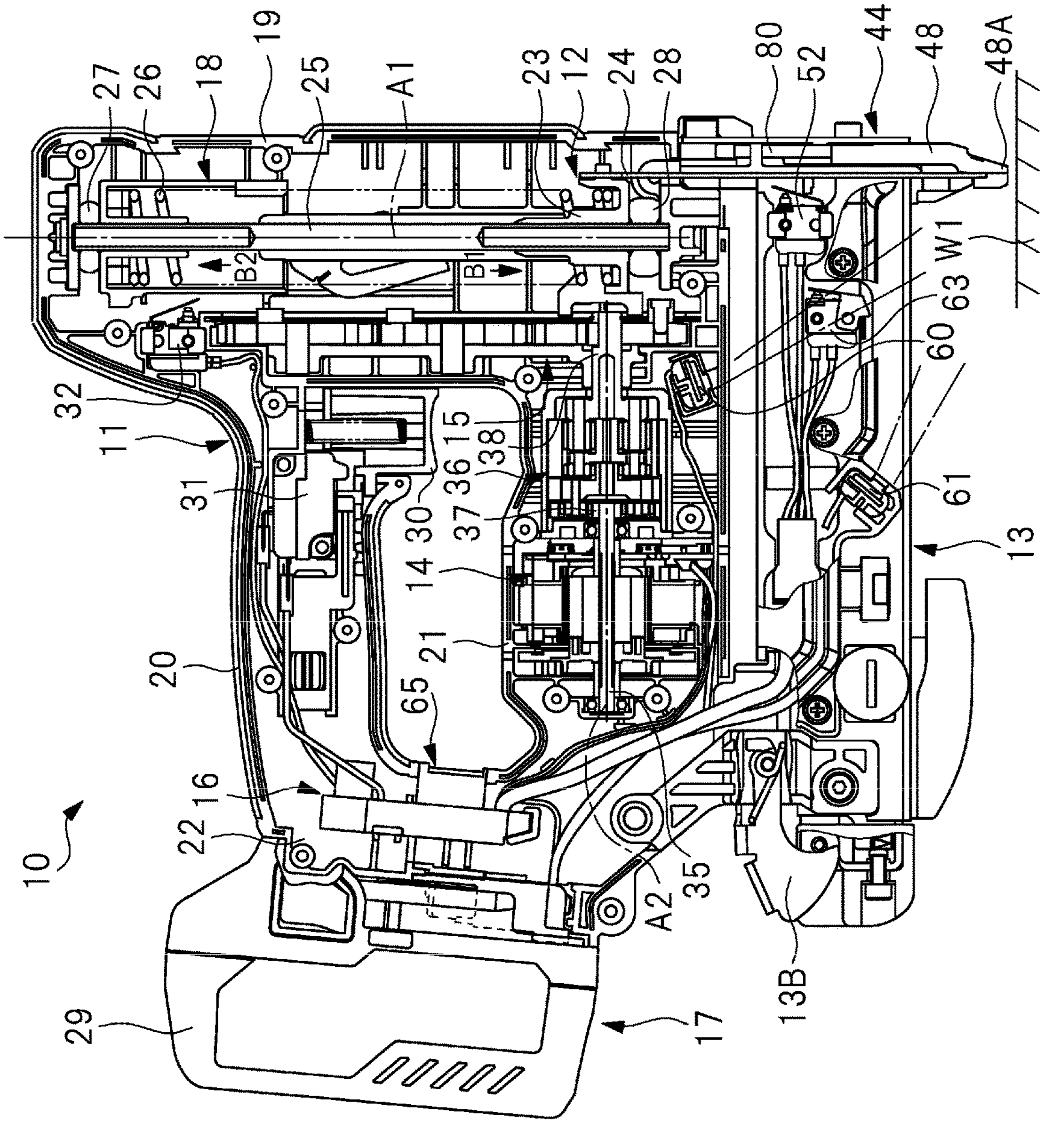
FIG. 1 is a side cross-sectional view showing an overall structure of a working tool according to the first embodiment of the present invention.
Figure 2:
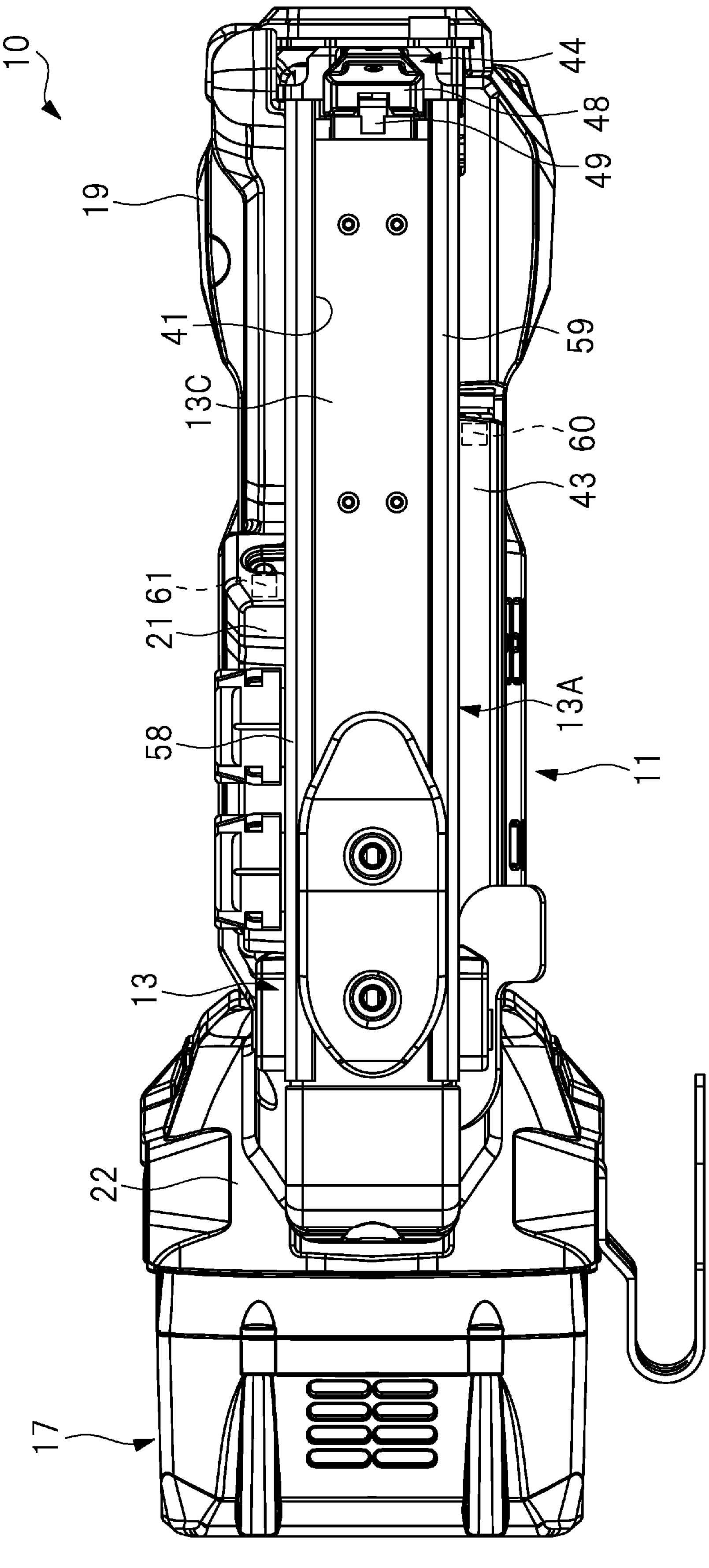
FIG. 2 is a bottom view of the working tool.
Figure 3:
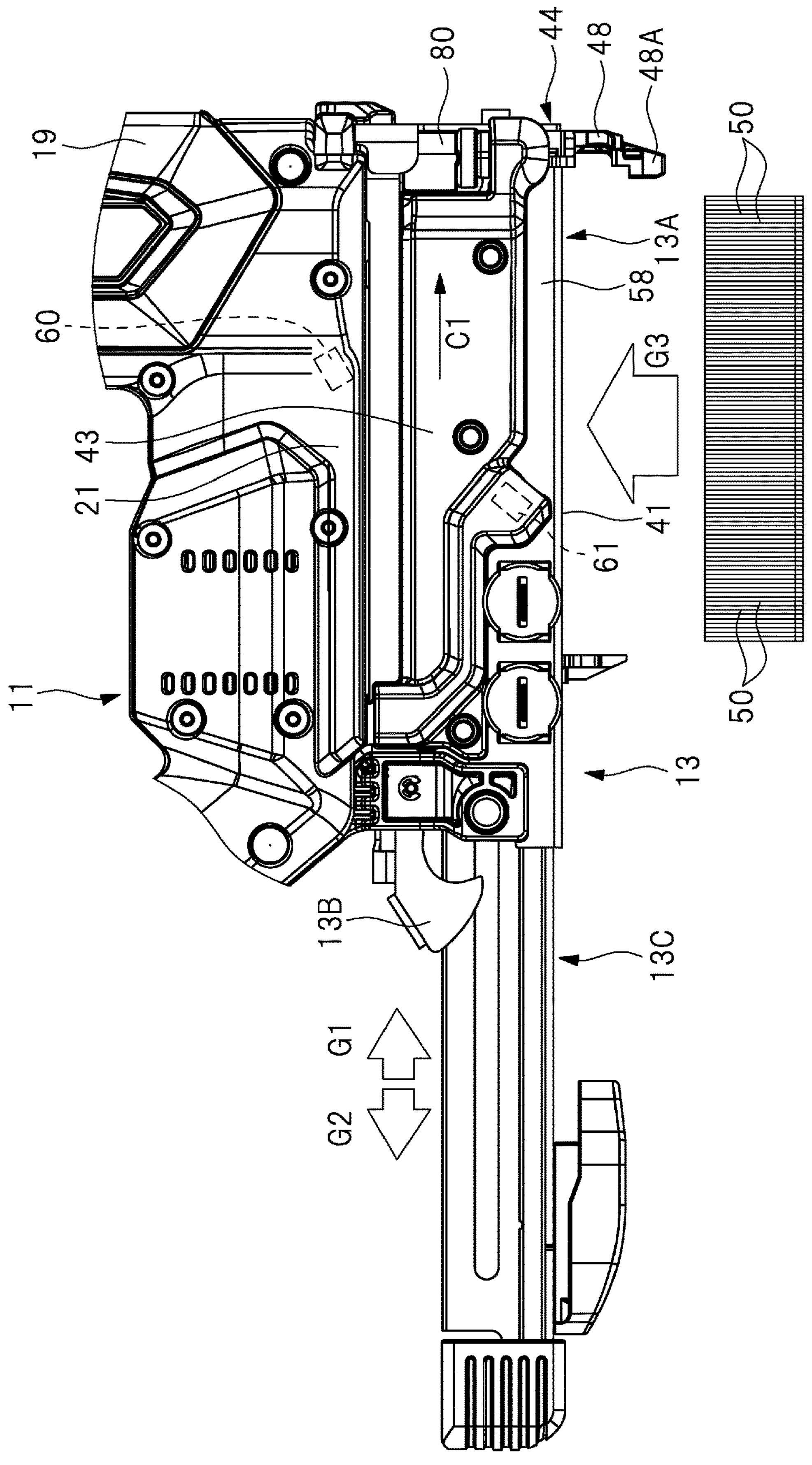
FIG. 3 is a side view of a motor case and a magazine provided in the working tool, showing an example of loading nails into the magazine.

Hereinafter, a working tool according to the present invention will be described with reference to drawings. FIG. 1 is a side cross-sectional view showing an overall structure of a working tool according to the first embodiment of the present invention. FIG. 2 is a bottom view of the working tool. FIG. 3 is a side view of a motor case and a magazine provided in the working tool, showing an example of loading nails into the magazine.

A nailer 10 shown in FIG. 1, FIG. 2, and FIG. 3 includes a housing 11, a striking unit 12, a magazine 13, an electric motor (drive source) 14, a power transmission unit 15, a control circuit 16, a power supply unit 17, and a counterweight 18. The housing 11 has a cylindrical body portion 19, a handle 20 connected to the body portion 19, and a motor case 21 connected to the body portion 19. A mounting portion 22 is connected to the handle 20 and the motor case 21.

The striking unit 12 is provided over the inside and outside of the body portion 19. The striking unit 12 has a plunger 23 and a driver blade 24. The driver blade 24 is fixed to the plunger 23. A plunger shaft 25 is fixedly mounted within the body portion 19. The striking unit 12 is attached to the plunger shaft 25 and can be actuated with respect to the plunger shaft 25 in a direction along a center line A1. The center line A1 is a virtual line passing through the center of the plunger shaft 25.

The counterweight 18 is provided in the body portion 19. The counterweight 18 suppresses the recoil received by the housing 11 when the striking unit 12 is actuated. The counterweight 18 is attached to the plunger shaft 25 and can be actuated with respect to the plunger shaft 25 in the direction along the center line A1.

A spring 26 is disposed in the body portion 19, and the spring 26 is arranged between the plunger 23 and the counterweight 18 in the direction along the center line A1. The spring 26 is a metal compression coil spring.

A weight bumper 27 and a plunger bumper 28 are provided in the body portion 19. Both the weight bumper 27 and the plunger bumper 28 are made of synthetic rubber.

In FIG. 1, the actuation direction in which the plunger 23 approaches the plunger bumper 28 and the actuation direction of the striking unit 12 in that case are defined as a first direction B1. Note that the movement of the striking unit 12 in the first direction B1 is referred to as the descent of the striking unit 12. Further, the actuation direction in which the plunger 23 is separated from the plunger bumper 28 and the actuation direction of the striking unit 12 in that case are defined as a second direction B2. Note that the movement of the striking unit 12 in the second direction B2 is referred to as the ascent of the striking unit 12.

The power supply unit 17 is detachably attached to the mounting portion 22, and the power supply unit 17 has a housing case 29 and a plurality of battery cells housed in the housing case 29. The battery cell is a secondary battery that can be charged and discharged, and any one of a lithium ion battery, a nickel hydrogen battery, a lithium ion polymer battery, and a nickel cadmium battery can be used as the battery cell.

The electric motor 14 has a drive shaft 35, and the drive shaft 35 rotates when electric power is supplied to the electric motor 14 from the power supply unit 17. A speed reducer 36 is arranged in the motor case 21. The speed reducer 36 has a planetary gear mechanism, an input element 37, and an output element 38, and the input element 37 is coupled to the drive shaft 35. When the rotational force of the drive shaft 35 is transmitted to the speed reducer 36, the rotation speed of the output element 38 becomes lower than the rotation speed of the input element 37 in the speed reducer 36. The electric motor 14 and the speed reducer 36 are arranged concentrically about a center line A2.

The power transmission unit 15 converts the rotational force of the output element 38 into the actuation force of the striking unit 12 and converts the rotational force of the output element 38 into the actuation force of the counterweight 18. The power transmission unit 15 has a plurality of gears and engaging portions. A rotation regulating mechanism (not shown) is provided in the motor case 21. When a rotational force is transmitted to the output element 38 from the plunger 23, the rotation regulating mechanism prevents the output element 38 from rotating in the reverse direction due to the rotational force. Further, the rotation regulating mechanism allows the output element 38 to rotate in the forward direction by the rotational force of the electric motor 14.

A nose portion 44 is provided on the body portion 19. The nose portion 44 protrudes from the body portion 19 in the direction along the center line A1. The nose portion 44 has a blade guide 80 fixed to the body portion 19 and a push lever 48 attached to the blade guide 80. The push lever 48 is movable with respect to the blade guide 80 in the direction along the center line A1. The blade guide 80 guides the movement of the driver blade 24 and guides the movement of the push lever 48. The worker can bring a tip 48A of the push lever 48 into contact with and away from an object W1 during the work to drive a fastener into the object W1.

The magazine 13 is supported by the nose portion 44 and the motor case 21. An ejection path 49 is provided between the nose portion 44 and the magazine 13. The driver blade 24 is movable within the ejection path 49 in the direction along the center line A1.

The magazine 13 is arranged between the tip 48A of the push lever 48 and the motor case 21 in the direction along the center line A1 in FIG. 1. As shown in FIG. 3, the magazine 13 has a magazine frame 13A, a lock member 13B, and a magazine base 13C. The magazine frame 13A is fixed to the nose portion 44 and the motor case 21. For example, the magazine frame 13A is made of metal. The magazine frame 13A has two side walls 58 and 59 as shown in FIG. 2. The two side walls 58 and 59 are parallel at an interval.

Figure 4:
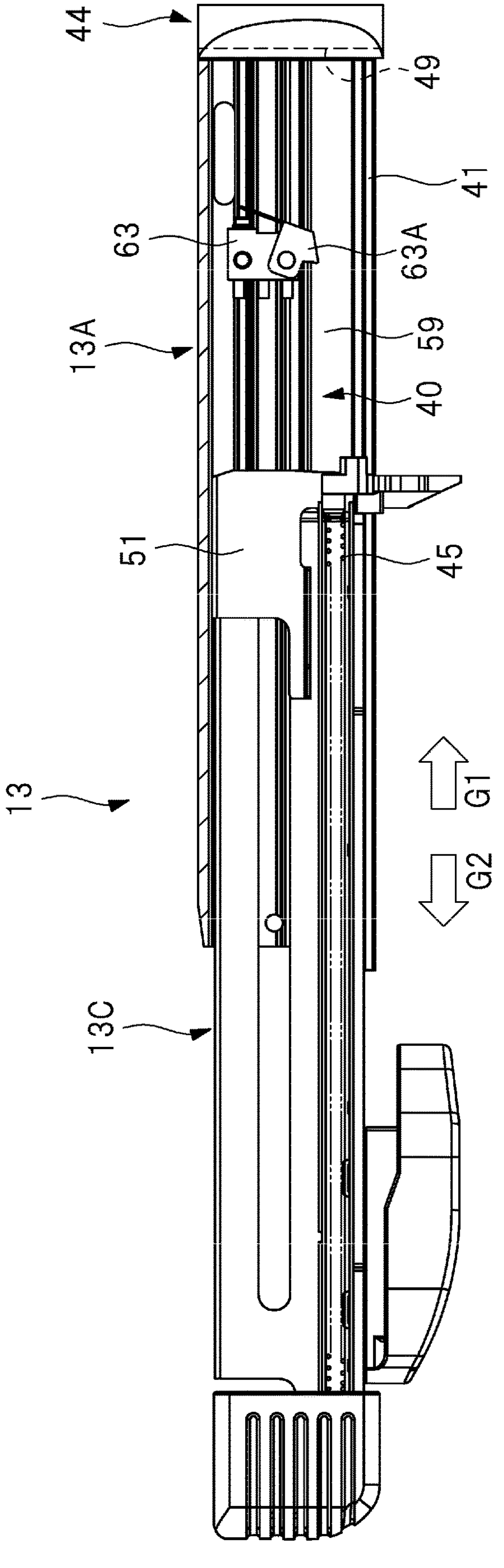
FIG. 4 is a side cross-sectional view showing a state where an opening of the magazine is open.

A storage chamber 40 shown in FIG. 4 is provided between the side walls 58 and 59 and communicates with an opening 41. In the magazine 13, the opening 41 is the position closest to the tip 48A of the push lever 48 in the direction along the center line A1. The opening 41 is located at the lower end of the magazine 13 in the direction along the center line A1. The storage chamber 40 is a space capable of storing a plurality of nails 50. The opening 41 is a path for loading the nails 50 into the storage chamber 40. The magazine 13 can store the nails 50 in a straight line in the storage chamber 40. A feeding direction C1 of the nails 50 is the same as the direction in which the nails 50 are arranged in a line. Furthermore, a magazine cover 43 that partially covers an outer surface of the side wall 58 is provided. The magazine cover 43 is made of, for example, synthetic resin. The magazine cover 43 is attached to side wall 58.

The magazine base 13C is movable with respect to the magazine frame 13A in an insertion direction G1 and a drawing direction G2. The insertion direction G1 and the drawing direction G2 are parallel to the feeding direction C1. The insertion direction G1 and the drawing direction G2 are opposite to each other. When the magazine base 13C is moved in the insertion direction G1, the magazine base 13C approaches the nose portion 44. When the magazine base 13C is moved in the drawing direction G2, the magazine base 13C is separated from the nose portion 44. The worker can switch the lock member 13B between a locked state and an unlocked state by operating the lock member 13B. When the magazine base 13C is moved in the insertion direction G1 and the lock member 13B is switched to the locked state, the magazine base 13C is fixed to the magazine frame 13A as shown in FIG. 2. When the lock member 13B is switched to the unlocked state, the worker can move the magazine base 13C in the drawing direction G2 as shown in FIG. 3.

When the worker sets the nails 50 in the storage chamber of the magazine 13, first, the worker draws out the magazine base 13C from the magazine frame 13A to stop it as shown in FIG. 3. Then, the opening 41 is opened. Further, the worker approaches the group of nails 50 from below the magazine frame 13A in a third direction G3 and loads the group of nails 50 into the storage chamber 40 through the opening 41. The third direction G3 is the direction along the center line A1 representing the actuation direction of the striking unit 12. Next, the worker moves the magazine base 13C in the insertion direction G1 to stop it, and operates the lock member 13B. As a result, the magazine base 13C is fixed to the magazine frame 13A. Namely, the opening 41 is closed.

Further, as shown in FIG. 4, FIG. 5, FIG. 6, and FIG. 7, a feeder 51 is attached to the magazine base 13C. In the state where the magazine base 13C is separated from the nose portion 44 or in the state where the magazine base 13C is in contact with the nose portion 44, the feeder 51 can move with respect to the magazine frame 13A in the insertion direction G1 and the drawing direction G2. The feeder 51 is biased by a spring 45 in the insertion direction G1. The feeder 51 linearly feeds the nails 50 stored in the storage chamber 40 toward the ejection path 49. Further, the feeder 51 has a contact portion 51A.

A push lever switch 52 shown in FIG. 1 is provided in the magazine frame 13A. The push lever switch 52 detects whether the push lever 48 is in contact with the object W1 or the push lever 48 is separated from the object W1, and outputs a signal.

The handle 20 is a portion that the worker grips by hand, and a trigger 30 and a trigger switch 31 are provided in the handle 20. The trigger switch 31 is turned on when the worker applies an operating force to the trigger 30 with a finger, and the trigger switch 31 is turned off when the operating force on the trigger 30 is released. A weight detection switch 32 is provided in the body portion 19. The weight detection switch 32 detects the position of the counterweight 18 in the direction of the center line A1 and outputs a signal.

Figure 8:
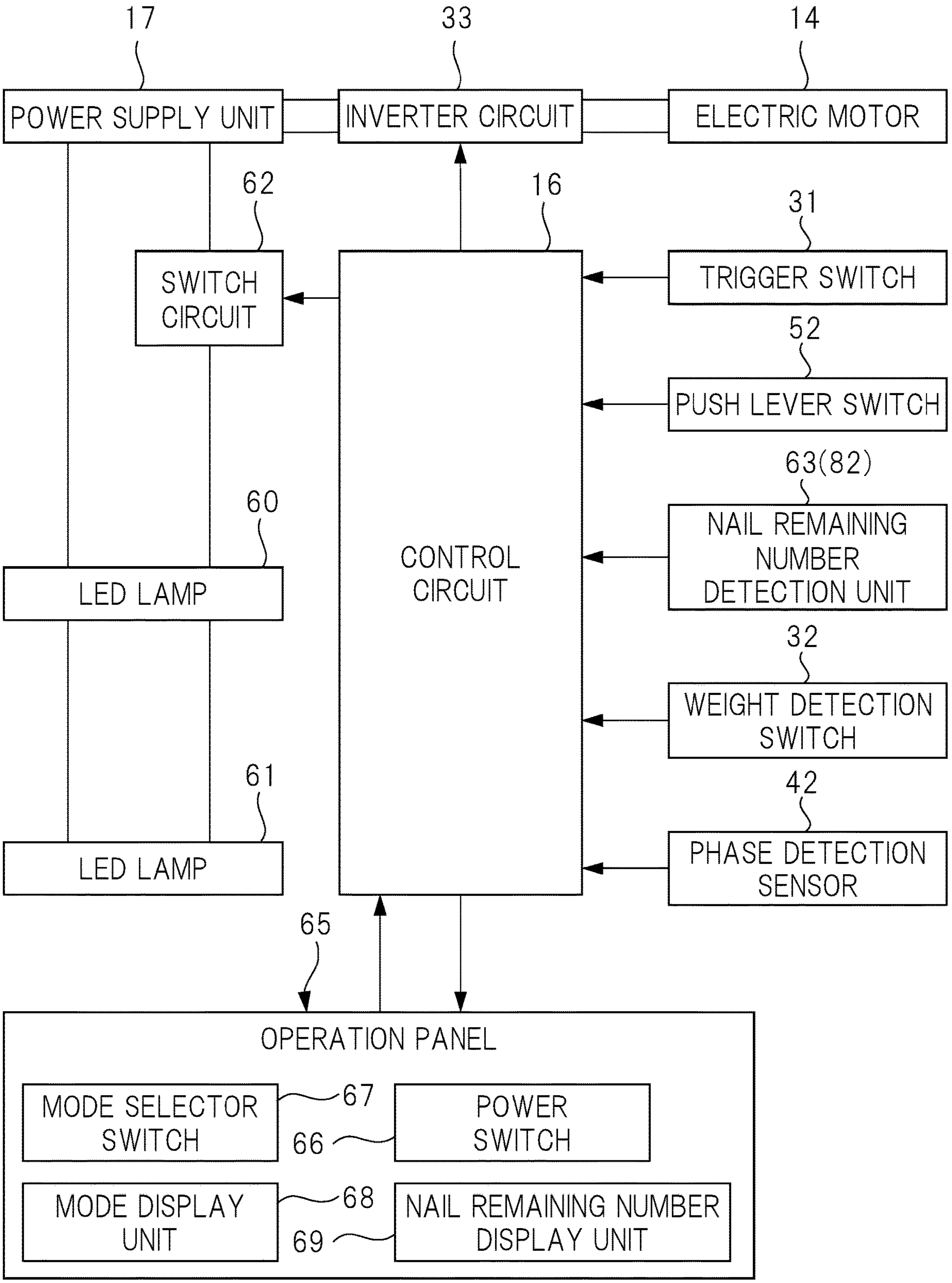
FIG. 8 is a block diagram showing a control system of the working tool.

A control system of the nailer 10 is shown in FIG. 8. The control circuit 16 is provided in the mounting portion 22. The control circuit 16 is activated when the power supply unit 17 is attached to the mounting portion 22. The control circuit 16 stops when the power supply unit 17 is detached from the mounting portion 22. The control circuit 16 is a microcomputer having an input interface, an output interface, a central processing unit, a storage device, and a timer.

Further, an inverter circuit 33 is provided in, for example, the motor case 21. The inverter circuit 33 constitutes a part of an electric circuit between the electric motor 14 and the power supply unit 17. The inverter circuit 33 has a plurality of switching elements, and the plurality of switching elements are turned on and off, respectively. A phase detection sensor 42 is provided in the motor case 21. The phase detection sensor 42 detects the phase of the drive shaft 35 in the rotation direction and outputs a signal. The signal from the trigger switch 31, the signal from the push lever switch 52, and the signal from the weight detection switch 32 are input to the control circuit 16, respectively.

The worker can use the nailer 10 as follows. When the worker releases the operating force on the trigger 30 and separates the push lever 48 from the object W1, the control circuit 16 stops the electric motor 14. Therefore, the striking unit 12 is stopped at the standby position, and the counterweight 18 is stopped at the standby position.

When the worker applies an operating force to the trigger 30 and presses the push lever 48 to the object W1, the control circuit 16 causes the electric motor 14 to rotate. The rotational force of the electric motor 14 is transmitted to the power transmission unit 15 via the speed reducer 36. Then, the striking unit 12 is actuated in the second direction B2, and the counterweight 18 is actuated in the first direction B1.

When an engaging portion of the power transmission unit 15 is released from the plunger 23, the striking unit 12 is actuated in the first direction B1 from the top dead center to the bottom dead center. Therefore, the driver blade 24 strikes one nail 50 sent to the ejection path 49, and the nail 50 is driven into the object W1. Since the counterweight 18 is actuated in the direction opposite to that of the striking unit 12, vibration of the housing 11 is suppressed.

Thereafter, when the engaging portion of the power transmission unit 15 is engaged with the plunger 23, the striking unit 12 is actuated in the second direction B2. Further, when the engaging portion of the power transmission unit 15 is engaged with the counterweight 18, the counterweight 18 is actuated in the first direction B1. Then, when the control circuit 16 detects that the striking unit 12 has reached the standby position, the control circuit 16 stops the electric motor 14. Therefore, the counterweight 18 is also stopped at the standby position.

The nailer 10 has an illumination unit. The illumination unit is a light source that emits light onto a location where the nail 50 is to be driven, thereby improving the visibility and workability of the worker. The light to be emitted is, for example, visible light. Two LED (Light Emitting Diode) lamps 60 and 61 are provided as an example of the illumination unit. The LED lamp 60 is attached to the motor case 21 and the LED lamp 61 is attached to the magazine cover 43. The opening 41 is provided between the LED lamps 60 and 61 and the tip 48A of the push lever 48 in the actuation direction of the striking unit 12.

A switch circuit 62 is provided in the housing 11 or the magazine 13. The switch circuit 62 constitutes a part of a circuit that supplies voltage from the power supply unit 17 to the LED lamps 60 and 61. By controlling the switch circuit 62, the control circuit 16 can control the voltage supplied to each of the LED lamps 60 and 61, for example, can perform the PWM (Pulse Width Modulation) control. The LED lamps 60 and 61 are lit when a voltage is supplied, and light beams E1 emitted from the LED lamps 60 and 61 pass through the side of the opening 41 provided at the lower end of the magazine 13. The light beam E1 can reach the vicinity of the tip 48A of the push lever 48 or the vicinity of the part of the object W1 with which the tip 48A of the push lever 48 comes into contact.

The illuminance of the LED lamps 60 and 61 changes according to the supplied voltage. The illuminance can be defined also as light intensity, light amount, or luminance. When voltage is supplied to the LED lamps 60 and 61, the LED lamps 60 and 61 are lit. If no voltage is supplied to the LED lamps 60 and 61, the LED lamps 60 and 61 are extinguished.

Figure 5:
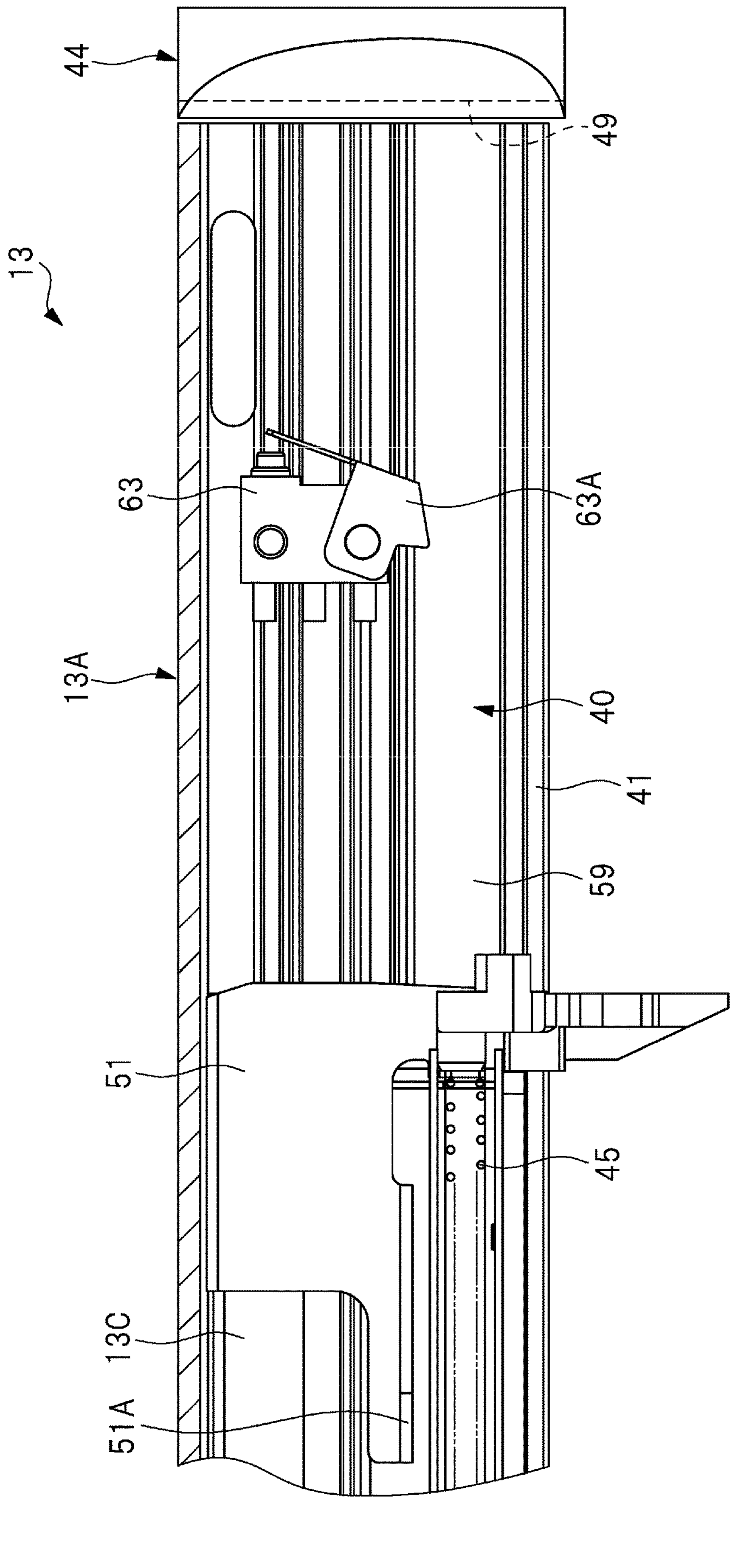
FIG. 5 is a side cross-sectional view showing the principal part of FIG. 4 in an enlarged manner.
Figure 6:
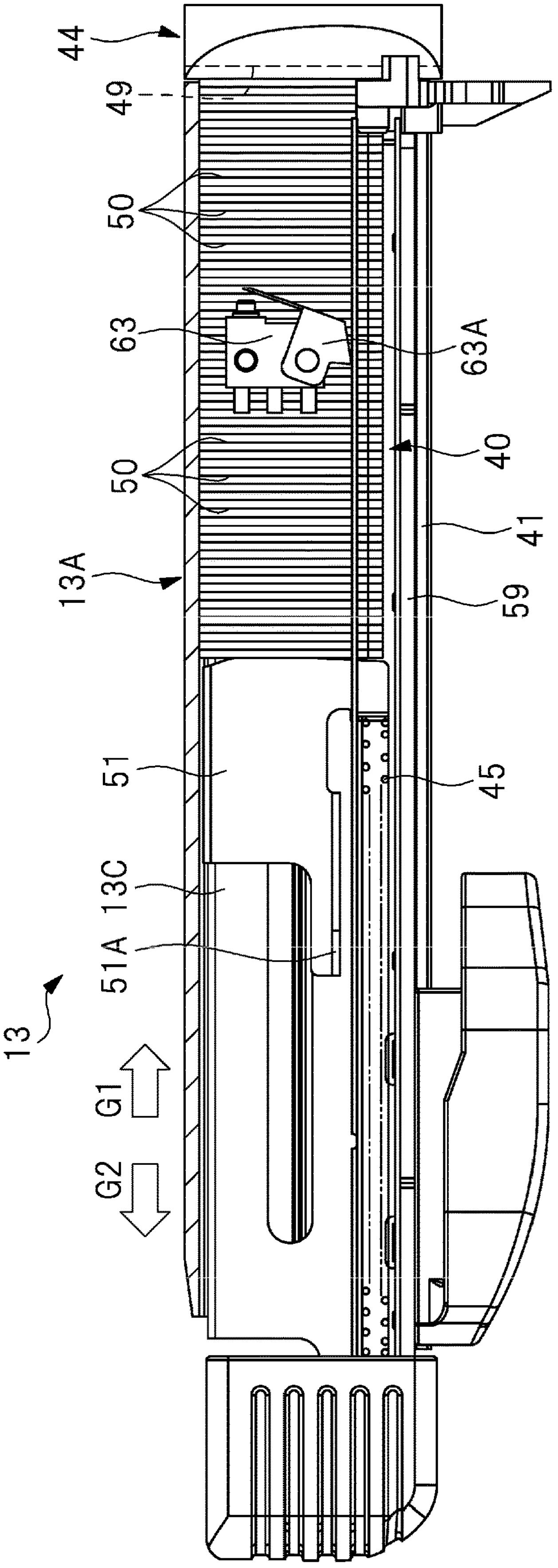
FIG. 6 is a side cross-sectional view showing an example in which the opening of the magazine is closed and the remaining number of nails is equal to or larger than a predetermined number.

A nail detection switch 63 which is an example of a nail remaining number detection unit is provided in the magazine frame 13A. The nail detection switch 63 has a movable piece 63A. The nail detection switch 63 is a contact sensor that outputs an ON signal and an OFF signal according to the position of the movable piece 63A. As shown in FIG. 5 and FIG. 6, when the contact portion 51A of the feeder 51 is separated from the movable piece 63A, the nail detection switch 63 is turned off regardless of whether the magazine base 13C closes the opening 41.

Figure 7:
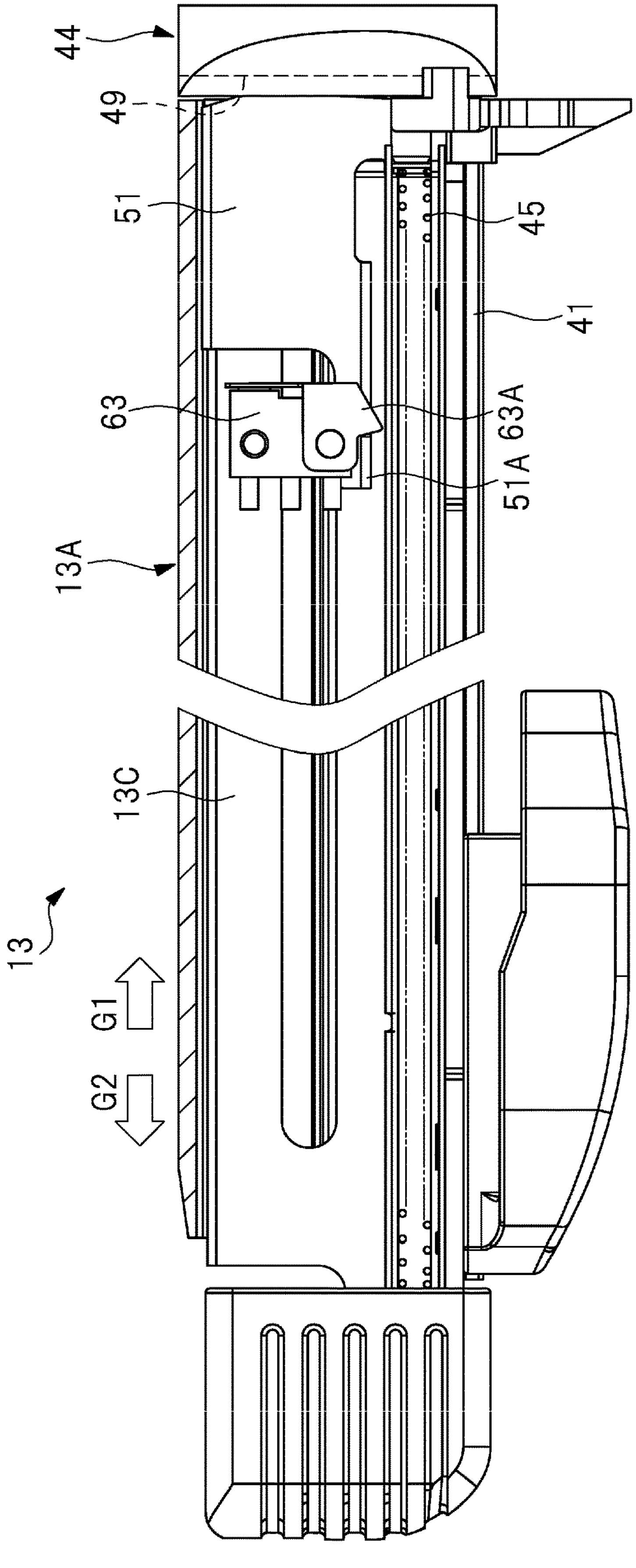
FIG. 7 is a side cross-sectional view showing an example in which the opening of the magazine is closed and the remaining number of nails is less than the predetermined number.

Further, when the magazine base 13C closes the opening 41 and the remaining number of nails 50 in the storage chamber 40 is less than a predetermined number, for example, "less than 1" as shown in FIG. 7, the movable piece 63A is pressed by the contact portion 51A of the feeder 51 and the nail detection switch 63 is turned on. The control circuit 16 can detect the remaining number of nails 50 in the magazine 13 by processing the signal of the nail detection switch 63. Further, after the nail detection switch 63 is turned on and it is detected that the remaining number of nails 50 is less than the predetermined number, when the nail detection switch 63 is turned off, the control circuit 16 determines that the magazine base 13C opens the opening 41 as shown in FIG. 5.

Further, an operation panel 65 shown in FIG. 1 is provided on the mounting portion 22. The worker can visually recognize and operate the operation panel 65. The operation panel 65 includes a power switch 66, a mode selector switch 67, a mode display unit 68, and a nail remaining number display unit 69. When the worker turns on the power switch 66, the control circuit 16 is activated, which enables the signal transmission and reception between the control circuit 16 and the operation panel 65. The worker can change and select the mode by operating the mode selector switch 67. The mode defines a nailing method including a single fire mode and a continuous fire mode. The power switch 66 may not be provided. The control circuit 16 may be configured to be activated by the operation of the trigger switch 31 or the push lever switch 52.

The worker can change and select the single fire mode (first mode) and the continuous fire mode (second mode) by operating the mode selector switch 67. For example, every time the worker presses the mode selector switch 67 once with a finger, the mode is changed in the order of the single fire mode and the continuous fire mode.

The control circuit 16 causes the mode display unit 68 to display the mode selected by the worker. For example, the mode display unit 68 includes lamps corresponding to the single fire mode and the continuous fire mode, and can turn on the lamp of the selected mode. The nail remaining number display unit 69 can display the number of nails 50 stored in the storage chamber 40. Furthermore, the nail remaining number display unit 69 can display that the remaining number of nails 50 is less than a predetermined number. The nail remaining number display unit 69 includes a liquid crystal display or lamps. The control circuit 16 detects the number of nails 50 by processing the signal of the nail detection switch 63, and causes the nail remaining number display unit 69 to display the remaining number of nails 50.

Nailing Control Method

Figure 9:
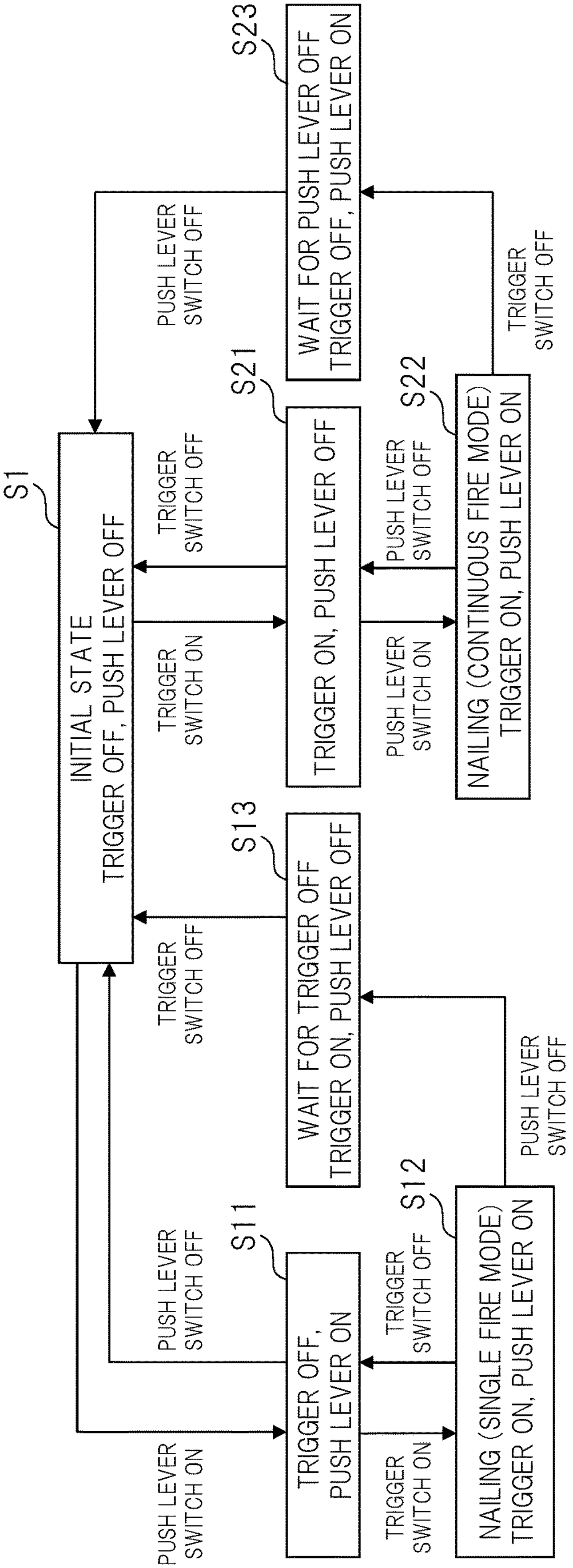
FIG. 9 is a state transition diagram showing an example of a nailing control method according to the first embodiment of the present invention.

Next, a nailing control method will be described. FIG. 9 is a state transition diagram showing an example of a nailing control method according to the first embodiment of the present invention. The nailing control is performed by the control circuit 16. As shown in FIG. 9, the control circuit 16 has a single fire mode and a continuous fire mode, and changes these modes by the operation of a worker. FIG. 10 is a table showing an example of an OFF determination time.

Single Fire Mode

First, the single fire mode will be described. In the single fire mode, in the state where the push lever 48 is at the ON position, that is, in the state where the push lever 48 is brought into contact with the object W1, the nail is driven by pulling on the trigger 30. When the nail is once driven, the next nail cannot be driven unless the trigger 30 is turned off.

At the start of operation, the trigger 30 of the nailer 10 is at an OFF position (first OFF position) and the push lever 48 is at an OFF position (second OFF position). This state is referred to as an initial state S1.

In the initial state S1, when the push lever 48 comes into contact with the object W1 and moves from the OFF position to an ON position (second ON position), the push lever switch 52 is turned on. Namely, the push lever 48 can be switched between the ON position and the OFF position by the operation of the worker. Then, the push lever switch 52 transmits a push lever ON signal indicating that the push lever 48 has moved from the OFF position to the ON position to the control circuit 16. In this case, the control circuit 16 changes the mode to the single fire mode.

When receiving the push lever ON signal from the push lever switch 52, the control circuit 16 determines that the push lever 48 has moved to the ON position (second ON determination), and the state transitions to the state S11.

In the state S11, when the trigger 30 moves from the OFF position to the ON position (first ON position), the trigger switch 31 is turned on. Namely, the trigger 30 can be switched between the ON position and the OFF position by the operation of the worker. Then, the trigger switch 31 transmits a trigger ON signal indicating that the trigger 30 has moved from the OFF position to the ON position to the control circuit 16.

When receiving the trigger ON signal, the control circuit 16 determines that the trigger 30 has moved to the ON position (first ON determination), and the state transitions to the state S12. Then, the control circuit 16 drives the electric motor 14 to drive the nail into the object W1. In this manner, the control circuit 16 controls the driving of the electric motor 14.

In the state S12, after the nail is driven, when the trigger 30 moves from the ON position to the OFF position, the trigger switch 31 is turned off. Then, the trigger switch 31 transmits a trigger OFF signal indicating that the trigger 30 has moved from the ON position to the OFF position to the control circuit 16.

When the OFF position is maintained until a predetermined OFF determination time (first OFF determination time) elapses after the trigger 30 moves from the ON position to the OFF position, the control circuit 16 determines that the trigger 30 has moved to the OFF position (first OFF determination), and the state returns from the state S12 to the state S11. This OFF determination time (first OFF determination time) is the OFF determination time of the trigger switch 31 in the single fire mode, and is set to, for example, 100 ms as shown in FIG. 10. Note that the OFF determination time of the trigger 30 in the single fire mode may be 50 ms or more. In the state S11 thus returned, when the trigger 30 moves to the ON position, the state transitions to the state S12 and the nail is driven again.

On the other hand, in the state S12, if the trigger 30 moves to the ON position even for a moment for some reason during the OFF determination time for the trigger 30, the control circuit 16 cannot determine that the trigger 30 has moved to the OFF position. In this case, the state S12 is maintained, but since the nail has already been driven, no special operation is performed. Then, the state cannot return to the state S11 until the OFF determination of the trigger 30 is made.

In the state S11, when the OFF position is maintained until a predetermined OFF determination time (second OFF determination time) elapses after the push lever 48 moves from the ON position to the OFF position, the control circuit 16 determines that the push lever 48 has moved to the OFF position (second OFF determination), and the state returns from the state S11 to the initial state S1. This OFF determination time (second OFF determination time) is the OFF determination time of the push lever 48 in the single fire mode, and is set to, for example, 30 ms as shown in FIG. 10. Note that the OFF determination time of the push lever 48 in the single fire mode may be less than 50 ms.

In the state S11, if the push lever 48 moves to the ON position even for a moment for some reason during the OFF determination time for the push lever 48, the control circuit 16 cannot determine that the push lever 48 has moved to the OFF position. In this case, the state S11 is maintained.

In the state S12, after the nail is driven, when the OFF position is maintained until a predetermined OFF determination time (second OFF determination time) elapses after the push lever 48 moves from the ON position to the OFF position, the control circuit 16 determines that the push lever 48 has moved to the OFF position (second OFF determination), and the state transitions from the state S12 to the state S13. This OFF determination time (second OFF determination time) is set to, for example, 30 ms similarly to the state S11.

On the other hand, in the state S12, if the push lever 48 moves to the ON position even for a moment for some reason during the OFF determination time for the push lever 48, the control circuit 16 cannot make the OFF determination of the push lever 48. In this case, the state S12 is maintained, but since the nail has already been driven, no special operation is performed. Then, the state cannot transition to the state S13 until the OFF determination of the push lever 48 is made.

In the single fire mode, when the state transitions to the state S13, the state cannot return to the state S12 even if the ON determination of the push lever 48 is made again.

In the state S13, when the trigger 30 moves from the ON position to the OFF position and the OFF determination is made, the state returns from the state S13 to the initial state S1. This OFF determination time (first OFF determination time) is set to, for example, 30 ms similarly to the state S12. In the state S13, the control circuit 16 may make the OFF determination of the trigger 30 without providing the OFF determination time of the trigger 30, for the transition to the initial state S1.

As described above, when the OFF determination of the push lever 48 is made in the state where the trigger 30 is maintained at the ON position after the electric motor 14 is driven to drive the nail, the control circuit 16 does not drive the electric motor 14 again unless the OFF determination of the trigger 30 is made and the state returns to the initial state S1.

Continuous Fire Mode

Next, the continuous fire mode will be described. In the continuous fire mode, a nail is driven by bringing the push lever 48 into contact with the object W1 in the state where the trigger 30 is at the ON position. After the nail is driven, the push lever 48 is separated from the object W1, and then the push lever 48 is brought into contact with the object W1 again in the state where the ON position of the trigger 30 is maintained, whereby nails can be continuously driven.

As shown in FIG. 9, in the initial state S1, when the trigger 30 moves to the ON position, the trigger switch 31 is turned on. Then, the trigger switch 31 transmits a trigger ON signal indicating that the trigger 30 has moved from the OFF position to the ON position to the control circuit 16. In this case, the control circuit 16 changes the mode to the continuous fire mode.

When receiving the trigger ON signal from the trigger switch 31, the control circuit 16 makes the ON determination of the trigger 30, and the state transitions to the state S21.

In the state S21, when the push lever 48 moves to the ON position, the push lever switch 52 is turned on. Then, the push lever switch 52 transmits a push lever ON signal indicating that the push lever 48 has moved from the OFF position to the ON position to the control circuit 16.

When receiving the push lever ON signal, the control circuit 16 makes the ON determination of the push lever 48, and the state transitions to the state S22. Then, the control circuit 16 drives the electric motor 14 to drive the nail into the object W1.

In the state S22, after the nail is driven, when the push lever 48 moves from the ON position to the OFF position, the push lever switch 52 is turned off. Then, the push lever switch 52 transmits a push lever off signal indicating that the push lever 48 has moved from the ON position to the OFF position to the control circuit 16.

When the OFF position is maintained until a predetermined OFF determination time (second OFF determination time) elapses after the push lever 48 moves from the ON position to the OFF position, the control circuit 16 makes the OFF determination of the push lever 48, and the state returns from the state S22 to the state S21. This OFF determination time (second OFF determination time) is the OFF determination time of the push lever switch 52 in the continuous fire mode, and is set to, for example, 130 ms as shown in FIG. 10. Note that the OFF determination time of the push lever 48 in the continuous fire mode may be 50 ms or more. As described above, the OFF determination time of the push lever switch 52 in the continuous fire mode is longer than the OFF determination time of the push lever switch 52 in the single fire mode.

In the state S21 thus returned, when the push lever 48 moves to the ON position, the state transitions to the state S22, and the nail is driven again.

On the other hand, in the state S22, if the push lever 48 moves to the ON position even for a moment for some reason during the OFF determination time for the push lever 48, the control circuit 16 cannot make the OFF determination of the push lever 48. In this case, the state S22 is maintained, but since the nail has already been driven, no special operation is performed. Then, the state cannot return to the state S21 until the OFF determination of the push lever 48 is made.

In the state S21, when the OFF position is maintained until a predetermined OFF determination time (first OFF determination time) elapses after the trigger 30 moves from the ON position to the OFF position, the control circuit 16 makes the OFF determination of the trigger 30 and the state returns from the state S21 to the initial state S1. This OFF determination time (first OFF determination time) is the OFF determination time of the trigger 30 in the continuous fire mode, and is set to, for example, 30 ms as shown in FIG. 10. Note that the OFF determination time of the trigger 30 in the continuous fire mode may be less than 50 ms. As described above, the OFF determination time of the trigger switch 31 in the continuous fire mode is shorter than the OFF determination time of the trigger switch 31 in the single fire mode.

In the state S21, if the trigger 30 moves to the ON position even for a moment for some reason during the OFF determination time for the trigger 30, the control circuit 16 cannot make the OFF determination of the trigger 30. In this case, the state S21 is maintained.

In the state S22, after the nail is driven, when the OFF position is maintained until a predetermined OFF determination time (first OFF determination time) elapses after the trigger 30 moves from the ON position to the OFF position, the control circuit 16 makes the OFF determination of the trigger 30, and the state transitions from the state S22 to the state S23. This OFF determination time (first OFF determination time) is set to, for example, 30 ms similarly to the state S21.

On the other hand, in the state S22, if the trigger 30 moves to the ON position even for a moment for some reason during the OFF determination time for the trigger 30, the control circuit 16 cannot make the OFF determination of the trigger 30. In this case, the state S22 is maintained, but since the nail has already been driven, no special operation is performed. Then, the state cannot transition to the state S23 until the OFF determination of the trigger 30 is made.

The state S23 is a state of waiting for the push lever 48 being turned off. In the continuous fire mode, when the state transitions to the state S23, the state cannot return to the state S22 even if the ON determination of the trigger 30 is made again. In the state S23, when the OFF determination of the push lever 48 is made, the state returns from the state S23 to the initial state S1. This OFF determination time (second OFF determination time) is set to, for example, 130 ms similarly to the state S22. In the state S23, the control circuit 16 may make the OFF determination of the push lever 48 without providing the OFF determination time of the push lever 48, for the transition to the initial state S1.

As described above, when the OFF determination of the trigger 30 is made in the state where the push lever 48 is maintained at the ON position after the electric motor 14 is driven to drive the nail, the control circuit 16 does not drive the electric motor 14 again unless the OFF determination of the push lever 48 is made and the state returns to the initial state S1.

In the control method of FIG. 9, the control circuit 16 can perform control according to the operation procedure of the worker even if the mode is not set by the worker. Namely, although the control in each mode has been described by defining them as the single fire mode and the continuous fire mode for convenience in FIG. 9, the control circuit 16 can perform control according to the operation of the worker without setting each mode.

When the mode is set by the worker, the control circuit 16 performs control corresponding to the set mode and does not perform control corresponding to the mode that is not set. For example, in the case where the single fire mode is set, the control circuit 16 performs control corresponding to the single fire mode when the push lever 48 is operated in the initial state S1, but does not perform control corresponding to the continuous fire mode even when the trigger 30 is operated in the initial state S1. The same applies to the case where the continuous fire mode is set.

Main Effect of Present Embodiment

According to the present embodiment, the OFF determination time of the push lever 48 in the continuous fire mode is longer than the OFF determination time of the push lever 48 in the single fire mode. According to this configuration, even when the push lever 48 inadvertently comes into contact with the object W1 due to vibration or the like at the time of driving in the continuous fire mode, unintended nailing is less likely to be performed, and it is thus possible to suppress the misfire while keeping the operability.

Further, according to the present embodiment, the OFF determination time of the trigger 30 in the single fire mode is longer than the OFF determination time of the trigger 30 in the continuous fire mode. The OFF determination time of the push lever 48 in the continuous fire mode is longer than the OFF determination time of the trigger 30 in the single fire mode.

Specifically, the OFF determination time of the push lever 48 in the single fire mode and the OFF determination time of the trigger 30 in the continuous fire mode are less than 50 ms. Also, the OFF determination time of the trigger 30 in the single fire mode and the OFF determination time of the push lever 48 in the continuous fire mode are 50 ms or more.

According to this configuration, in the single fire mode, the misfire is suppressed because the OFF determination time of the trigger 30 is sufficiently secured, and the state easily transitions to the initial state S1 because the OFF determination time of the push lever 48 is shortened. Further, in the continuous fire mode, the misfire is suppressed because the OFF determination time of the push lever 48 is sufficiently secured, and the state easily transitions to the initial state S1 because the OFF determination time of the trigger 30 is shortened. Consequently, it is possible to suppress the misfire while keeping the operability.

Further, according to the present embodiment, the OFF determination time of the push lever 48 in the continuous fire mode is longer than the OFF determination time of the push lever 48 in the single fire mode. According to this configuration, in the single fire mode, the OFF determination of the push lever 48 is made in a short time to release the single fire mode, so that the inadvertent re-nailing can be prevented. Further, in the continuous fire mode, it is possible to prevent inadvertent re-nailing while maintaining the continuous fire mode.

Further, according to the present embodiment, the OFF determination time of the trigger 30 in the single fire mode is longer than the OFF determination time of the trigger 30 in the continuous fire mode. According to this configuration, in the single fire mode, it is possible to prevent inadvertent re-nailing while maintaining the single fire mode. Further, in the continuous fire mode, the OFF determination of the trigger 30 is made in a short time to release the continuous fire mode, so that inadvertent re-nailing can be prevented.

Second Embodiment

Next, the second embodiment will be described. In the present embodiment, another control method in the single fire mode will be described. The present embodiment assumes the case where the single fire mode is set in advance by the worker. In the following, description of portions overlapping with those of the above-described embodiment will be omitted in principle.

Figure 11:
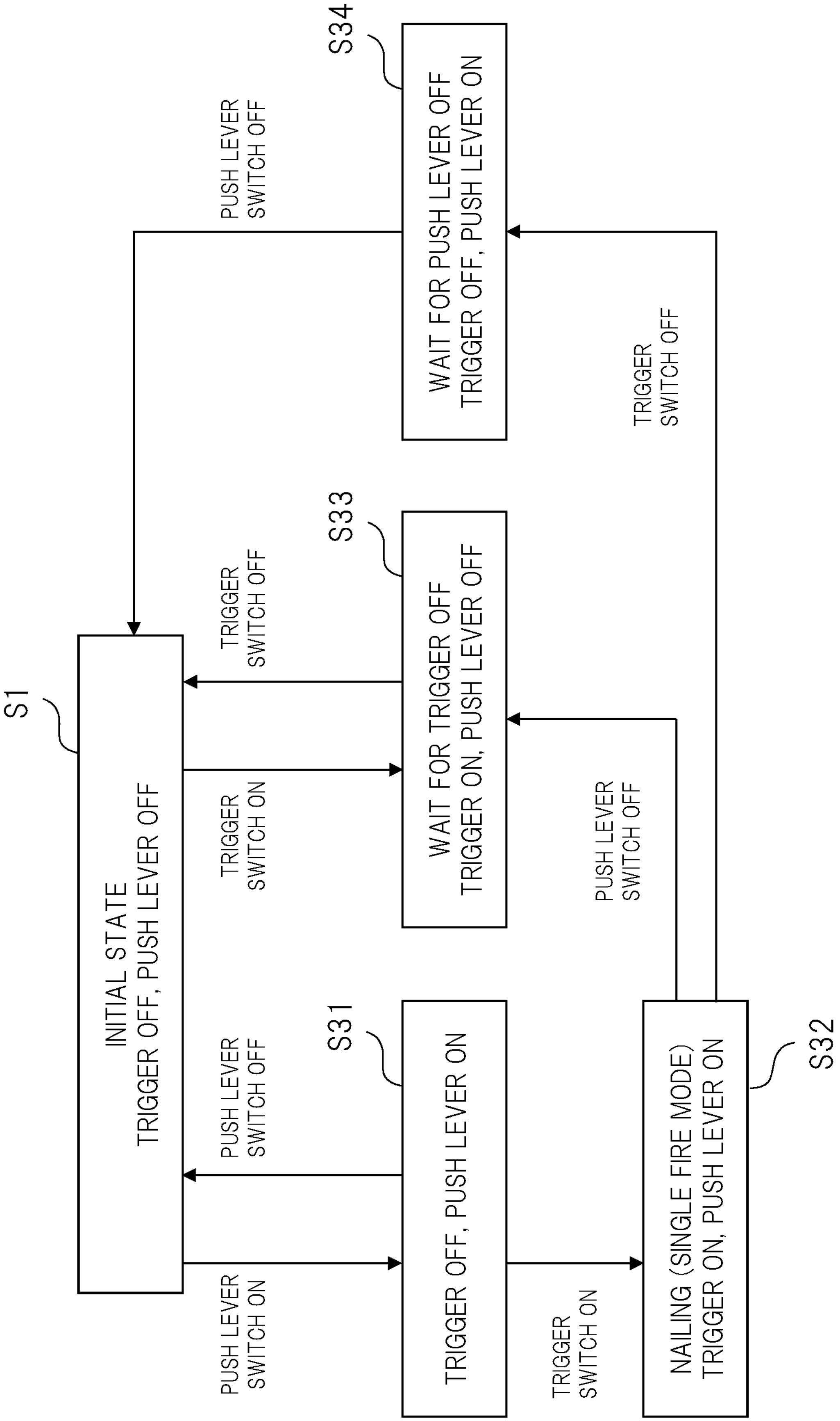
FIG. 11 is a state transition diagram showing an example of a nailing control method according to the second embodiment of the present invention.

FIG. 11 is a state transition diagram showing an example of a nailing control method according to the second embodiment of the present invention. For example, FIG. 11 shows a control method in a case where the single fire mode is set in advance by the worker. FIG. 12 is a table showing another example of the OFF determination time. In the control method of FIG. 11, the OFF determination time of FIG. 12 is referred to.

First, in the initial state S1, when the push lever 48 moves from the OFF position to the ON position, the push lever switch 52 is turned on. Then, the control circuit 16 makes the ON determination of the push lever 48, and the state transitions to the state S31.

In the state S31, when the trigger 30 moves from the OFF position to the ON position, the trigger switch 31 is turned on. Then, the control circuit 16 makes the ON determination of the trigger 30 and the state transitions to the state S32. Then, the control circuit 16 drives the electric motor 14 to drive the nail into the object W1.

In the state S32, when the control circuit 16 makes the OFF determination of the trigger 30, the state transitions to the state S34. The OFF determination time (first OFF determination time) at this time is the OFF determination time of the trigger 30 in the single fire mode, and is set to, for example, 30 ms as shown in FIG. 12. Note that the OFF determination time of the trigger 30 in the single fire mode may be less than 50 ms.

The state S34 is a state of waiting for the push lever 48 being turned off. When the state transitions to the state S34, the state cannot return to the state S32 even if the ON determination of the trigger 30 is made again. In the state S34, when the OFF determination of the push lever 48 is made, the state returns from the state S34 to the initial state S1. This OFF determination time (second OFF determination time) is the OFF determination time of the push lever 48 in the single fire mode, and is set to, for example, 30 ms as shown in FIG. 12. Note that the OFF determination time of the push lever 48 in the single fire driving mode may be less than 50 ms. In the state S34, the control circuit 16 may make the OFF determination of the push lever 48 without providing the OFF determination time of the push lever 48, for the transition to the initial state S1.

On the other hand, in the state S32, when the control circuit 16 makes the OFF determination of the push lever 48, the state transitions to the state S33. The OFF determination time (second OFF determination time) at this time is the OFF determination time of the push lever 48 in the single fire mode, and is set to, for example, 30 ms as shown in FIG. 12. Note that the OFF determination time of the push lever 48 in the single fire mode may be less than 50 ms. As described above, in the single fire mode, the OFF determination time of the trigger 30 and the OFF determination time of the push lever 48 may be set to be the same.

The state S33 is a state of waiting for the trigger 30 being turned off. When the state transitions to the state S33, the state cannot return to the state S32 even if the ON determination of the push lever 48 is made again. In the state S33, when the OFF determination of the trigger 30 is made, the state returns from the state S33 to the initial state S1. This OFF determination time (first OFF determination time) is the OFF determination time of the push lever 48 in the single fire mode, and is set to, for example, 30 ms as shown in FIG. 12. In the state S33, the control circuit 16 may make the OFF determination of the trigger 30 without providing the OFF determination time, for the transition to the initial state S1.

As described above, in the present embodiment, when the nail is once driven, the next nail cannot be driven unless the state returns to the initial state.

In the state S31, when the control circuit 16 makes the OFF determination of the push lever 48, the state returns to the initial state S1. The OFF determination time (second OFF determination time) at this time is the same as that of the state S34. Also in the state S31, the control circuit 16 may make the OFF determination of the push lever 48 without providing the OFF determination time, for the transition to the initial state S1.

In addition, in the initial state S1, when the control circuit 16 makes the ON determination of the trigger 30, the state transitions to the state S33. As described above, since the state S33 is a state of waiting for the trigger 30 being turned off, the nail is not driven even if the ON determination of the push lever 48 is made.

According to the present embodiment, in the single fire mode, when the nail is once driven, the next nail cannot be driven unless the state returns to the initial state S1. According to this configuration, even when the push lever 48 inadvertently comes into contact with the object W1 due to vibration or the like at the time of driving, unintended nailing is less likely to be performed, and it is thus possible to further suppress the misfire while keeping the operability.

Third Embodiment

Next, in the present embodiment, another control method in the continuous fire mode will be described. The present embodiment assumes the case where the continuous fire mode is set in advance by the worker.

Figure 13:
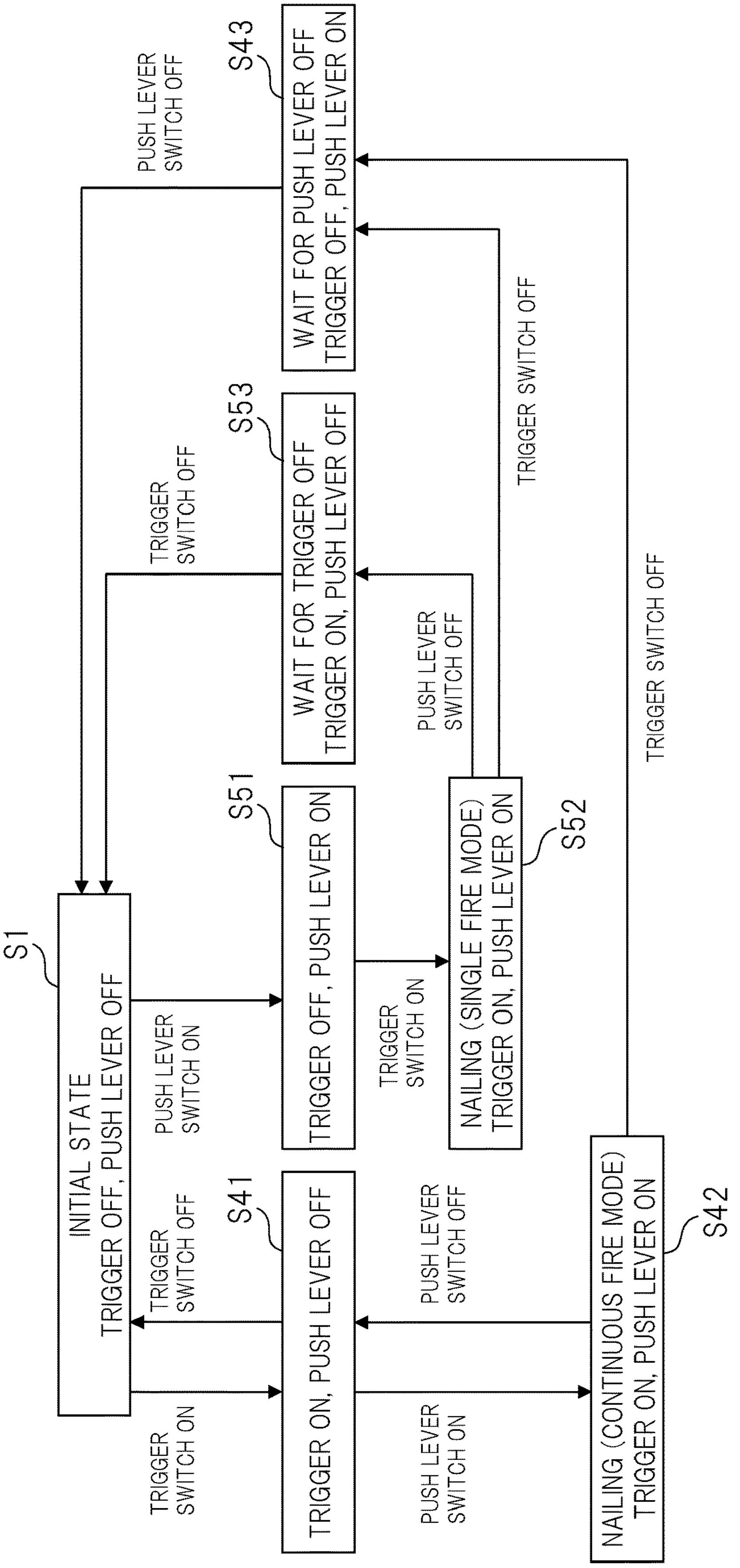
FIG. 13 is a state transition diagram showing an example of a nailing control method according to the third embodiment of the present invention.

FIG. 13 is a state transition diagram showing an example of a nailing control method according to the third embodiment of the present invention. Also in the control method of FIG. 13, the OFF determination time of FIG. 12 is referred to.

First, in the initial state S1, when the trigger 30 moves from the OFF position to the ON position, the trigger switch 31 is turned on. Then, the control circuit 16 makes the ON determination of the trigger, and the state transitions to the state S41.

In the state S41, when the push lever 48 moves from the OFF position to the ON position, the push lever switch 52 is turned on. Then, the control circuit 16 makes the ON determination of the push lever 48, and the state transitions to the state S42. Then, the control circuit 16 drives the electric motor 14 to drive the nail into the object W1.

In the state S42, after the nail is driven, when the push lever 48 moves from the ON position to the OFF position, the push lever switch 52 is turned off. When the control circuit 16 makes the OFF determination of the push lever 48, the state returns to the state S41. The OFF determination time (second OFF determination time) at this time is the OFF determination time of the push lever 48 in the continuous fire mode, and is set to, for example, 130 ms as shown in FIG. 12. Alternatively, the table in FIG. 10 may be referred to as the OFF determination time at this time. Then, when the ON determination of the push lever 48 is made again in the state S41, the state transitions to the state S42, and the nail is driven again.

On the other hand, in the state S42, when the control circuit 16 makes the OFF determination of the trigger 30, the state transitions to the state S43. The OFF determination time (first OFF determination time) at this time is the OFF determination time of the trigger 30 in the continuous fire mode, and is set to, for example, 30 ms as shown in FIG. 12. Note that the OFF determination time of the trigger 30 at this time may be less than 50 ms. As described above, in the continuous fire mode, the OFF determination time of the push lever 48 is longer than the OFF determination time of the trigger 30.

The state S43 is a state of waiting for the push lever 48 being turned off. When the state transitions to the state S43, the state cannot return to the state S42 even if the ON determination of the trigger 30 is made again. In the state S43, when the OFF determination of the push lever 48 is made, the state returns from the state S43 to the initial state S1. This OFF determination time (second OFF determination time) is the OFF determination time of the push lever 48 in the continuous fire mode, and is set to, for example, 130 ms as shown in FIG. 12. In the state S43, the control circuit 16 may make the OFF determination of the push lever 48 without providing the OFF determination time, for the transition to the initial state S1.

In the state S41, when the control circuit 16 makes the OFF determination of the push lever 48, the state returns to the initial state S1. The OFF determination time (second OFF determination time) at this time is the same as that of the state S43.

Single Fire in Continuous Fire Mode

Next, control of the single fire in the continuous fire mode will be described. In the initial state S1, when the control circuit 16 makes the ON determination of the push lever 48, the state transitions to the state S51. In the state S51, when the control circuit 16 makes the ON determination of the trigger 30, the state transitions to the state S52. Then, the control circuit 16 drives the electric motor 14 to drive the nail into the object W1.

In the state S52, when the control circuit 16 makes the OFF determination of the push lever 48, the state transitions to the state S53. The OFF determination time (second OFF determination time) at this time is, for example, the OFF determination time of the push lever 48 in the single fire mode, and is set to, for example, 30 ms as shown in FIG. 12. Alternatively, it may be the OFF determination time of the push lever 48 in the continuous fire mode, and may be set to, for example, 130 ms with reference to FIG. 12 and FIG. 10.

The state S53 is a state of waiting for the trigger 30 being turned off. When the state transitions to the state S53, the state cannot return to the state S52 even if the ON determination of the push lever 48 is made again. In the state S53, when the OFF determination of the trigger 30 is made, the state returns from the state S53 to the initial state S1. This OFF determination time (first OFF determination time) is the OFF determination time of the trigger 30 in the single fire mode, and is set to, for example, 30 ms as shown in FIG. 12. Alternatively, the OFF determination time may be set to 100 ms with reference to FIG. 10. In the state S53, the control circuit 16 may make the OFF determination of the trigger 30 without providing the OFF determination time of the trigger 30, for the transition to the initial state S1.

In addition, in the state S52, when the control circuit 16 makes the OFF determination of the trigger 30, the state transitions to the state S43. The OFF determination time (first OFF determination time) at this time is the OFF determination time of the trigger 30 in the single fire mode, and is set to, for example, 30 ms as shown in FIG. 12. Alternatively, the OFF determination time may be set to 100 ms with reference to FIG. 10. The control of the state S43 is as described above.

In the present embodiment, the description has been given on the assumption of the case where the continuous fire mode is set, but the present invention is applicable also to the case where the mode is not set.

According to the present embodiment, it is possible to suppress the misfire while keeping the operability. Furthermore, according to the present embodiment, such control that the single fire mode is included in the continuous fire mode is performed. This makes it possible to drive the nail in the single fire mode even in the state where the continuous fire mode is set.

Note that the trigger 30 is an example of a first operation unit, and the push lever 48 is an example of a second operation unit. Alternatively, the push lever 48 is an example of the first operation unit, and the trigger 30 is an example of the second operation unit. Further, the trigger 30 or the push lever 48 is also an example of an operation unit.

REFERENCE SIGNS LIST

10: nailer, 12: striking unit, 13: magazine, 13C: magazine base, 14: electric motor, 15: power transmission unit, 16: control circuit, 26: spring, 30: trigger, 31: trigger switch, 40: storage chamber, 41: opening, 44: nose portion, 48: push lever, 50: nail, 52: push lever switch, 60, 61: LED lamp, 63: nail detection switch, 65: operation panel, B1: first direction, B2: second direction

The invention claimed is:

1. A working tool comprising:

a drive source;

a control circuit configured to control driving of the drive source;

a first operation unit operable to be switched between a first ON position and a first OFF position by an operation of a worker; and a second operation unit operable to be switched between a second ON position and a second OFF position by the operation of the worker, wherein the working tool is in an initial state when the first operation unit is at the first OFF position and the second operation unit is at the second OFF position, wherein the control circuit has a first mode and a second mode, wherein the control circuit is configured to make a first ON determination to determine that the first operation unit has moved from the first OFF position to the first ON position, a first OFF determination to determine that the first operation unit has moved from the first ON position to the first OFF position, a second ON determination to determine that the second operation unit has moved from the second OFF position to the second ON position, and a second OFF determination to determine that the second operation unit has moved from the second ON position to the second OFF position, wherein the control circuit makes the first OFF determination when the first OFF position is maintained until a first OFF determination time elapses after the first operation unit moves from the first ON position to the first OFF position, and the second OFF determination when the second OFF position is maintained until a second OFF determination time elapses after the second operation unit moves from the second ON position to the second OFF position, wherein, in the first mode, in the initial state in response to determining that the second ON determination is made and the first ON determination is made while the second operation unit is maintained at the second ON position, the control circuit drives the drive source, and when the drive source is driven and then, in response to the second OFF determination time passing after the second operation unit moves from the second ON position to the second OFF position, the second OFF determination is made, the control circuit does not drive the drive source again, unless the first OFF determination is made after the first operation unit moves from the first ON position to the first OFF position so that the working tool returns to the initial position, wherein, in the second mode, in the initial state, in response to determining that the first ON determination is made and the second ON determination is made while the first operation unit is maintained at the first ON position, the control circuit drives the drive source, and when the drive source is driven and then, in response to the second OFF determination time passing after the second operation unit moves from the second ON position to the second OFF position while the first operation unit is maintained at the first ON position, the second OFF determination is made, and then the second ON determination is made again, the control circuit drives the drive source, and wherein the second OFF determination time in the second mode is set longer than the second OFF determination time in the first mode.

2. The working tool according to claim 1, wherein, in the first mode, after driving the drive source, the control circuit drives the drive source again when the first OFF determination is made while the second operation unit is maintained at the second ON position and the first ON determination is made again, and wherein, in the second mode, after driving the drive source, the control circuit drives the drive source again when the second OFF determination is made while the first operation unit is maintained at the first ON position and the second ON determination is made again.

3. The working tool according to claim 1, wherein, in the first mode, in an initial state, in response to determining that the second ON determination is made and the first ON determination is made while the second operation unit is maintained at the second ON position, the control circuit drives the drive source, and when the drive source is driven and then, in response to the first OFF determination time passing after the first operation unit moves from the first ON position to the first OFF position while the second operation unit is maintained at the second ON position, the first OFF determination is made, the control circuit does not drive the drive source again, unless the second OFF determination is made after the second operation unit moves from the second ON position to the second OFF position so that the working tool returns to the initial position so that the working tool returns to the initial position, and wherein, in the second mode, in the initial state, in response to determining that the first ON determination is made and the first second ON determination is made while the first operation unit is maintained at the first ON position, the control circuit drives the drive source, and when the drive source is driven and then, in response to the first OFF determination time passing after the first operation unit moves from the first ON position to the first OFF position while the second operation unit is maintained at the second ON position, the first OFF determination is made, the control circuit does not drive the drive source again, unless the second OFF determination is made after the second operation unit moves from the second ON position to the second OFF position so that the working tool returns to the initial position, and wherein the first OFF determination time in the first mode is longer than the first OFF determination time in the second mode.

4. The working tool according to claim 3, wherein the second OFF determination time in the second mode is longer than the first OFF determination time in the first mode.

5. The working tool according to claim 3, wherein the second OFF determination time in the first mode and the first OFF determination time in the second mode are less than 50 ms, and wherein the first OFF determination time in the first mode and the second OFF determination time in the second mode are 50 ms or more.

6. The working tool according to claim 1, wherein, in the first mode, when the drive source is driven and then the first OFF determination is made while the second operation unit is maintained at the second ON position, the control circuit does not drive the drive source again unless the second OFF determination is made to return to the initial position, and wherein the second OFF determination time in the second mode is longer than the first OFF determination time in the first mode.

7. The working tool according to claim 6, wherein, in the first mode, the first OFF determination time is the same as the second OFF determination time.

8. The working tool according to claim 1, wherein, in the second mode, in the initial state, in response to determining that the second ON determination is made and then the first ON determination is made while the second operation unit is maintained at the second ON position, the control circuit drives the drive source, and when the drive source is driven and then, in response to the first OFF determination time passing after the first operation unit moves from the first ON position to the first OFF position while the second operation unit is maintained at the second ON position, the first OFF determination is made, the control circuit does not drive the drive source again, unless the second OFF determination is made after the second operation unit moves from the second ON position to the second OFF position so that the working tool returns to the initial position, and wherein, in the second mode, the second OFF determination time is longer than the first OFF determination time.

9. The working tool according to claim 1, wherein, in the second mode, in the initial state, in response to determining that the second ON determination is made and then the first ON determination is made while the second operation unit is maintained at the second ON position, the control circuit drives the drive source, and when the drive source is driven and then, in response to the second OFF determination time passing after the second operation unit moves from the second ON position to the second OFF position while the first operation unit is maintained at the first ON position, the second OFF determination is made, the control circuit does not drive the drive source again, unless the first OFF determination is made after the first operation unit moves from the first ON position to the first OFF position so that the working tool returns to the initial position, and wherein, in the second mode, the second OFF determination time is longer than the first OFF determination time.

10. The working tool according to claim 1, wherein a nail is driven into an object by driving the drive source.

11. A working tool comprising:

a drive source;

a control circuit configured to control driving of the drive source;

a first operation unit operable to be switched between a first ON position and a first OFF position by an operation of a worker; and a second operation unit operable to be switched between a second ON position and a second OFF position by the operation of the worker, wherein the control circuit is configured to make a first ON determination to determine that the first operation unit has moved from the first OFF position to the first ON position, a first OFF determination to determine that the first operation unit has moved from the first ON position to the first OFF position, a second ON determination to determine that the second operation unit has moved from the second OFF position to the second ON position, and a second OFF determination to determine that the second operation unit has moved from the second ON position to the second OFF position, wherein the control circuit makes the first OFF determination when the first OFF position is maintained until a first OFF determination time elapses after the first operation unit moves from the first ON position to the first OFF position, and the second OFF determination when the second OFF position is maintained until a second OFF determination time elapses after the second operation unit moves from the second ON position to the second OFF position, wherein the control circuit drives the drive source every time the second ON determination is made while the first operation unit is maintained at the first ON position and the first ON determination is maintained, and wherein the second OFF determination time is longer than the first OFF determination time.

* * * * *